(12) United States Patent
Cho et al.

(10) Patent No.: US 8,040,118 B2
(45) Date of Patent: Oct. 18, 2011

(54) LOW-DROPOUT VOLTAGE REGULATOR WITH LEVEL LIMITER LIMITING LEVEL OF OUTPUT VOLTAGE WHEN LEVEL OF LOAD CURRENT CHANGES AND METHOD OF OPERATING THE SAME

(75) Inventors: Sung-Il Cho, Gwanak-gu (KR); Sung-Man (Chang woo) Pang (Ha), Gwangmyeong-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 20 days.

(21) Appl. No.: 12/635,570

(22) Filed: Dec. 10, 2009

(65) Prior Publication Data
US 2010/0156364 A1 Jun. 24, 2010

(30) Foreign Application Priority Data
Dec. 24, 2008 (KR) .................. 10-2008-0132841

(51) Int. Cl.
*G05F 1/08* (2006.01)
*G05F 1/153* (2006.01)
(52) U.S. Cl. ......... 323/273; 323/274; 323/275; 323/281
(58) Field of Classification Search ........... 323/273–281
See application file for complete search history.

(56) References Cited

U.S. PATENT DOCUMENTS

| 5,686,821 A * | 11/1997 | Brokaw .................. 323/273 |
| 6,157,182 A * | 12/2000 | Tanaka et al. ............ 323/284 |
| 7,015,680 B2 * | 3/2006 | Moraveji et al. .......... 323/274 |
| 2007/0285077 A1 * | 12/2007 | Hasegawa .............. 323/351 |

* cited by examiner

*Primary Examiner* — Gary L Laxton
*Assistant Examiner* — Nusrat Quddus
(74) *Attorney, Agent, or Firm* — Sherr & Vaughn, PLLC

(57) ABSTRACT

A low-dropout (LDO) voltage regulator that includes an error amplifier which compares a reference voltage with a feedback voltage of an output voltage and outputs an error signal based on the result of the comparison, the error amplifier being biased by an input voltage; a first MOS transistor having a gate electrically connected to the error signal, a source electrically connected to the input voltage and a drain electrically connected to the output voltage; a voltage divider which transmits a predetermined part of the output voltage to the error amplifier as feedback voltage; and a level limiter which limits a level of the output voltage from changing beyond and below an offset voltage when a level of a load current changes. In accordance with embodiments, A predetermined number of comparators and MOS transistor type-switches are provided to enhance the slew ratio of the regulated output voltage and to reduce standby electricity consumption.

18 Claims, 4 Drawing Sheets

Figure 1:
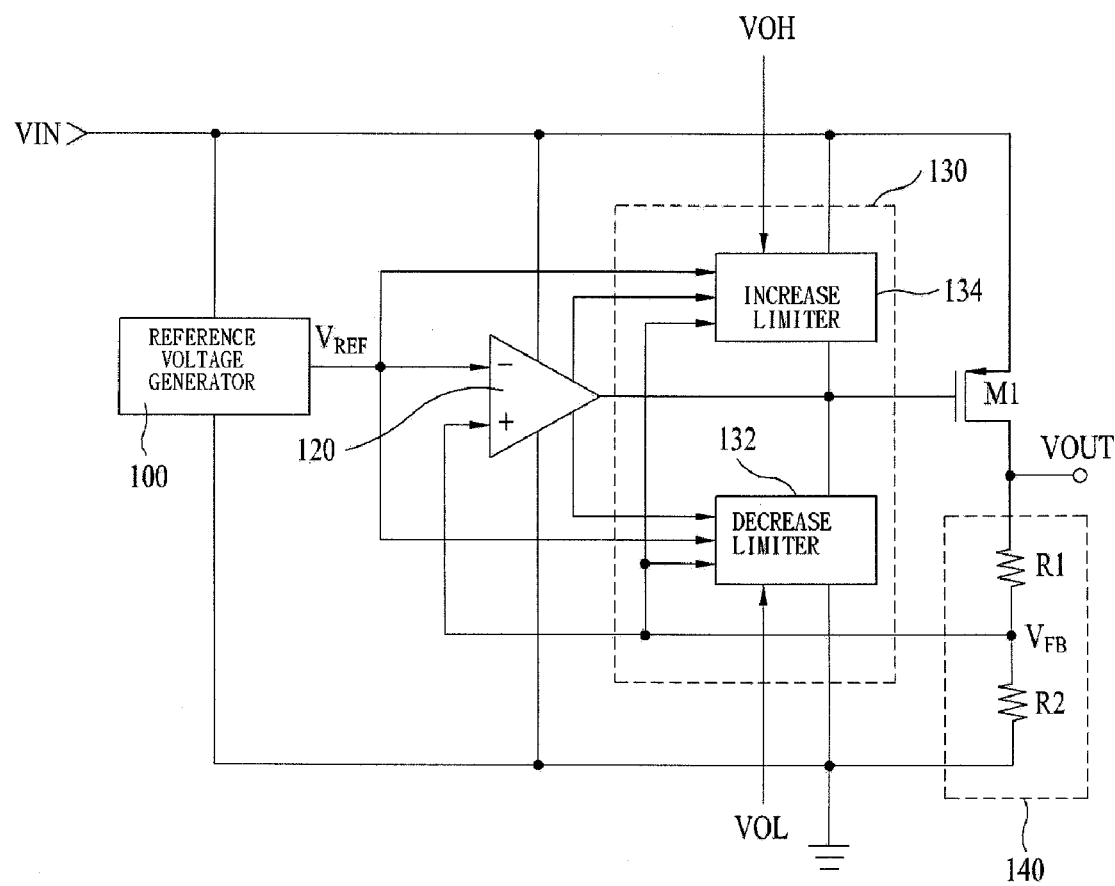

LOW-DROPOUT VOLTAGE REGULATOR WITH LEVEL LIMITER LIMITING LEVEL OF OUTPUT VOLTAGE WHEN LEVEL OF LOAD CURRENT CHANGES AND METHOD OF OPERATING THE SAME

The present application claims priority under 35 U.S.C. §119 to Korean Patent Application No. 10-2008-0132841 (filed on Dec. 24, 2008), which is hereby incorporated by reference in its entirety.

BACKGROUND

A low-dropout (LDO) voltage regulator is used generally in power feeding equipment to supply a regulated voltage. Such a LDO voltage regulator is configured of an integrated circuit to be usable in various electric products. Some or all of the elements included in the LDO voltage regulator may incorporate standard digital CMOS technology.

The configuration of the conventional LDO regulator is disclosed in U.S. Pat. No. 6,046,577 entitled "LOW-DROP-OUT VOLTAGE REGULATOR INCORPORATING A CURRENT EFFICIENT TRANSIENT RESPONSE BOOST CIRCUIT," U.S. Patent Publication No. 2007/0241728 entitled "LOW-DROPOUT VOLTAGE REGULATOR WITH A VOLTAGE SLEW RATE EFFICIENT TRANSIENT RESPONSE BOOST CIRCUIT," U.S. Pat. Nos. 6,710,583 and 6,304,31 entitled "LOW DROPOUT VOLTAGE REGULATOR WITH NON-MILLER FREQUENCY COMPENSATION."

According to the LDO voltage regulator disclosed hereinabove, loop is eliminated by using an error amplifier under a time-varying load current atmosphere. However, it is limited to improve transient response of an output voltage by using only error amplifier and thus the above conventional LDO regulator would have a good slew rate of the stable output voltage.

SUMMARY

Embodiments relate to a low-dropout voltage regulator and a method of operating the same.

Embodiments relate to a low-dropout voltage regulator and a method of operating the same that enhances a slew rate of an output voltage.

In accordance with embodiments, a low-dropout (LDO) voltage regulator can include at least one of the following: an error amplifier which compares a reference voltage with a feedback voltage of an output voltage and then outputs an error signal based on the result of the comparison, the error amplifier being biased by an input voltage; a first MOS transistor having a gate connected to the error signal, a source electrically connected to the input voltage and a drain electrically connected to the output voltage; a voltage divider which feed-backs a predetermined part of the output voltage to the error amplifier as feedback voltage; and a level limiter which limits a level of the output voltage from changing beyond and below an offset voltage when a level of a load current changes.

In accordance with embodiments, a low-dropout (LDO) voltage regulator can include at least one of the following: an error amplifier comprising a plurality of transistors which compares a reference voltage with a feedback voltage of an output voltage and outputs an error signal based on the result of the comparison, the error amplifier being biased by an input voltage; a first MOS transistor having a gate electrically connected to the error signal, a source electrically connected to the input voltage and a drain electrically connected to the output voltage; a voltage divider which transmits a predetermined part of the output voltage to the error amplifier as feedback voltage, the voltage divider including a first resistance and a second resistance electrically connected in series between the output voltage and the ground; and a level limiter which limits a level of the output voltage from changing beyond and below an offset voltage when a level of a load current changes.

In accordance with embodiments, a method of operating a LDO voltage regulator may include at least one of the following: synthesizing a reference voltage and an offset voltage; and limiting a level of the output voltage from changing beyond and below the offset voltage when a level of a load current changes by comparing a feed-backed part of an output voltage and the result of the synthesizing.

In accordance with embodiments, a predetermined number of comparators and MOS transistor type-switches may be simply provided additionally. As a result, embodiments can enhance slew ratio of a regulated output voltage and reduced standby electricity consumption.

DRAWINGS

Example FIG. 1 illustrates a low-dropout (LDO) voltage regulator in accordance with embodiments.

Figure 2:
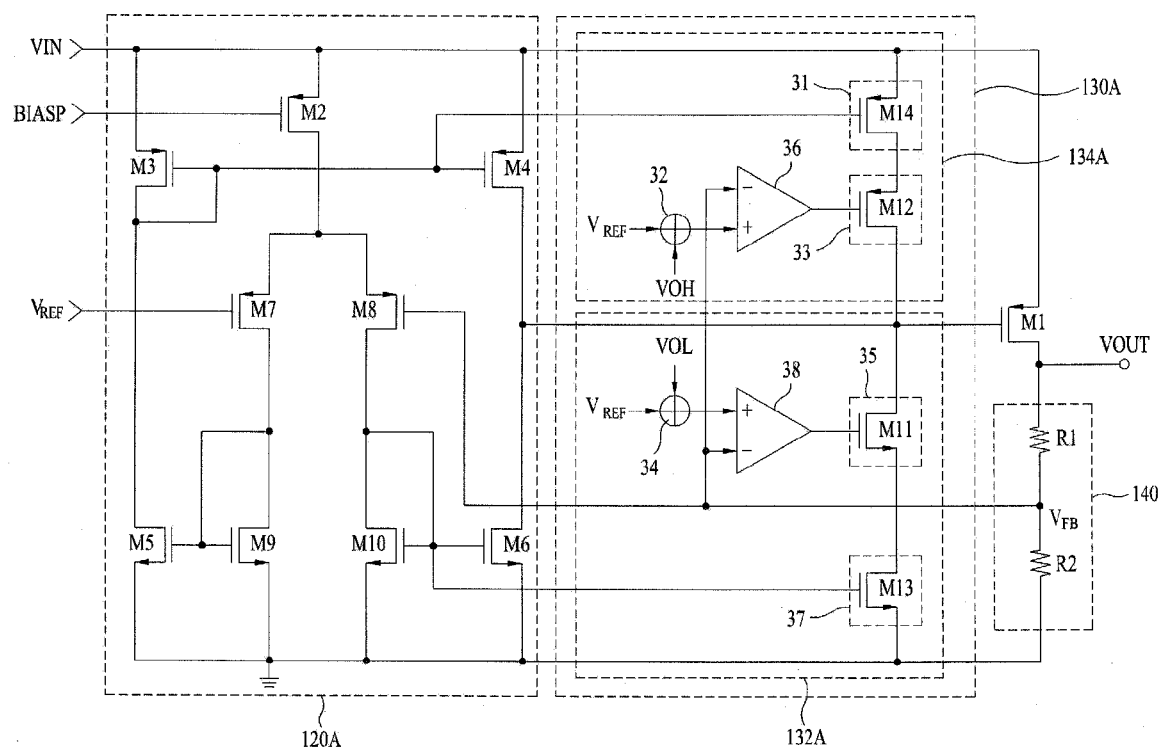
Figure 3:
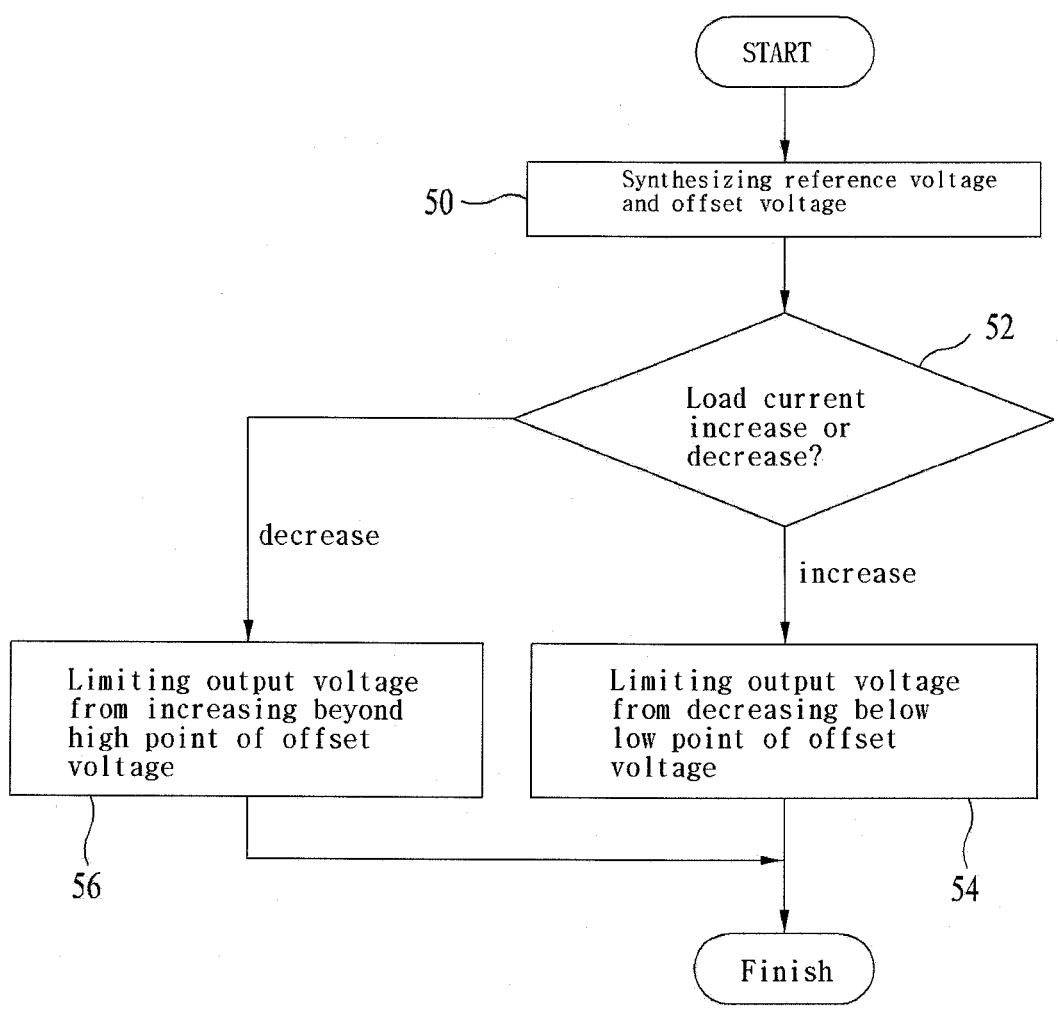

Example FIG. 2 illustrates an error amplifier and a level limiter illustrated in example FIG. 1, in accordance with embodiments;

Example FIG. 3 illustrates a method of operating a LDO voltage regulator, in accordance with embodiments.

Figure 4:
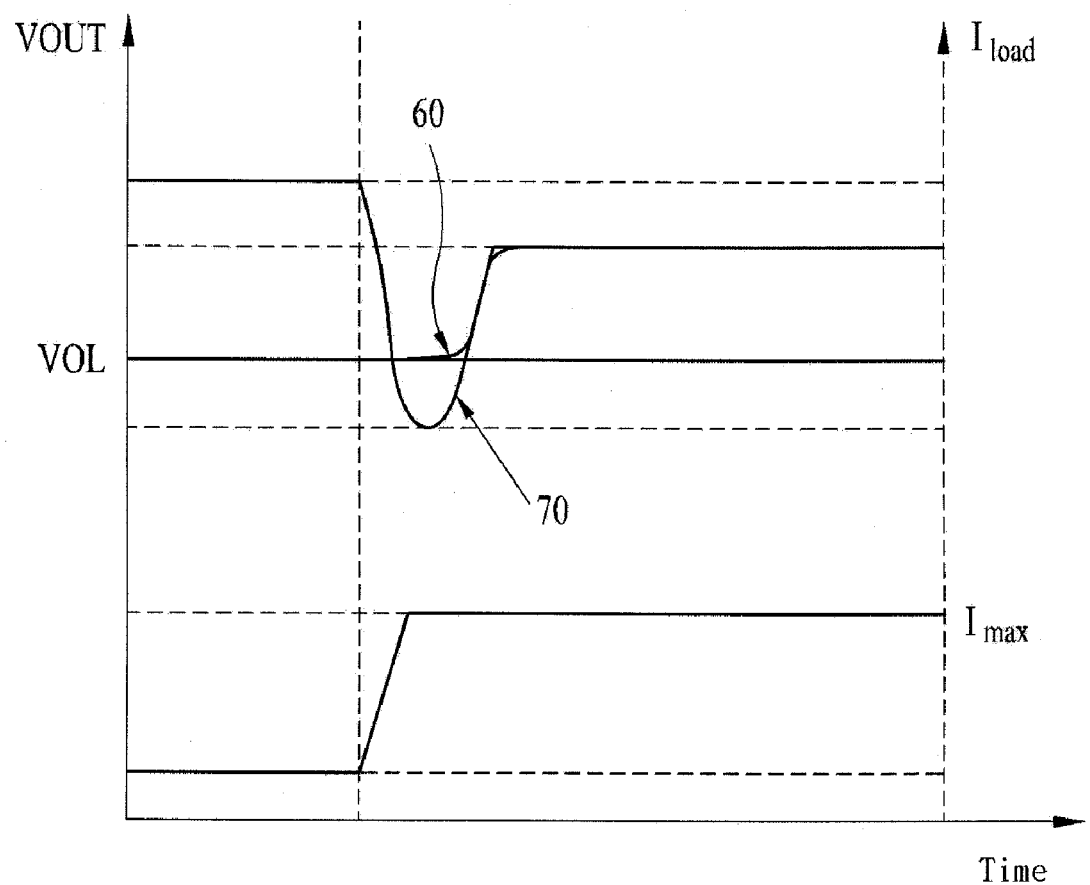

Example FIG. 4 illustrates a method of operating a LDO voltage regulator, in accordance with embodiments.

DESCRIPTION

As illustrated in example FIG. 1, an LDO voltage regulator in accordance with embodiments includes reference voltage generator 100, error amplifier 120, first MOS transistor (M1), level limiter 130 and voltage divider 140. Reference voltage generator 100 is electrically connected between an input voltage $V_{IN}$ and ground to generate a reference voltage $V_{REF}$. Reference voltage generator 100 may be a bandgap voltage generator that is used to generate reference voltage $V_{REF}$.

First MOS transistor $M_1$ may include a gate connected to an error signal transmitted from error amplifier 120, a source connected to input voltage $V_{IN}$ and a drain connected to output voltage $V_{OUT}$. For such a configuration, first MOS transistor $M_1$ may be a PMOS power transistor. A voltage of first MOS transistor $M_1$ that is a pass device may be referenced to as "drop-out." In accordance with embodiments, it is more preferable as the drop-out voltage is less.

Error amplifier 120 is biased to input voltage $V_{IN}$ and compares a feedback voltage $V_{FB}$ of reference voltage $V_{REF}$ with feedback voltage $V_{FB}$ of output voltage $V_{OUT}$ to output an error signal based on the result of the comparison to a gate of first MOS transistor $M_1$. Meaning, for the rapid and precise operation of the regulator illustrated in example FIG. 1, error amplifier 120 senses and amplifies the difference between reference voltage $V_{REF}$ and feedback voltage $V_{FB}$. Error amplifier 120 may be an operational trans-impedance amplifier (OTA). To make embodiments understood, the OTA-type error amplifier 120 is embodied in the LDO voltage regulator in accordance with embodiments but is not limited thereto. Particularly, error amplifier 120 illustrated in example FIG. 2 may be various other types which may be applicable to embodiments.

As illustrated in example FIG. 2, embodiments may include error amplifier 120A and level limiter 130A of error amplifier 120 and level limiter 130 illustrated in example FIG. 1. Amplifier 120A may include a plurality of MOS transistors, such as second transistor $M_2$, third transistor $M_3$, fourth transistor $M_4$, fifth transistor $M_5$, sixth transistor $M_6$, seventh transistor $M_7$, eight transistor $M_8$, ninth transistor $M_9$ and tenth transistor $M_{10}$. For example, second transistor $M_2$, third transistor $M_3$, fourth transistor $M_4$, seventh transistor $M_7$ and eighth transistor $M_8$ may be configured as a PMOS transistor. On the other hand, fifth transistor $M_5$, sixth transistor $M_6$, ninth transistor $M_9$ and tenth transistor $M_{10}$ may be configured as a NMOS transistor. The configuration of each transistor will be described as follows.

Second transistor $M_2$ includes a source connected to input voltage $V_{IN}$ and a gate connected to a positive bias voltage. Third transistor $M_3$ has a source connected to input voltage $V_{IN}$ and a gate/drain diode-connected to each other. Fourth transistor $M_4$ has a source connected to input voltage $V_{IN}$, a gate connected to the gate of third transistor $M_3$ and a drain connected to the gate of first transistor $M_1$. Fifth transistor $M_5$ has a source connected to the gate/drain of third transistor $M_3$ and a drain connected to a ground. Sixth transistor $M_6$ has a source connected to both the drain of fourth transistor $M_4$ and the gate of first transistor $M_1$ and also a drain connected to the ground.

Seventh transistor $M_7$ has a source connected to the drain of second transistor $M_2$ and a gate connected to reference voltage $V_{REF}$. Eighth transistor $M_8$ has a source connected to the drain of second transistor $M_2$ and a gate connected to feedback voltage $V_{FB}$. Ninth transistor $M_9$ has a diode-wiring source/gate connected to both the drain of seventh transistor $M_7$ and the gate of fifth transistor $M_5$ and also a drain connected to the ground. Tenth transistor $M_{10}$ has a diode-wiring source/gate connected to both the drain of eight transistor $M_8$ and the gate of sixth transistor $M_6$ and also a drain connected to the ground.

Voltage divider 140 transmits a predetermined part of output voltage $V_{OUT}$ to error amplifier 120 as feedback voltage $V_{FB}$. Voltage divider 140 may include first resistance $R_1$ and second resistance $R_2$ electrically connected in series between output voltage $V_{OUT}$ and the ground. An area between first resistance $R_1$ and second resistance $R_2$ corresponds to feedback voltage $V_{FB}$.

Level limiter 130 limits levels of output voltage $V_{OUT}$ from changing beyond and below an offset voltage $V_{OL}$ when levels of the load current changes rapidly. For that, level limiter 130 may include increase limiter 134 and decrease limiter 132. The load current is referenced as a current that flows along an outside load electrically connected to output voltage $V_{OUT}$. Decrease limiter 132 limits the increase of output voltage $V_{OUT}$ below a low point of offset voltage $V_{OL}$ when the load current increases.

As illustrated in example FIG. 2, decrease limiter 132 includes first synthesizer 34, first switch 35 and first comparator 38. First switch 35 switches between the gate of first MOS transistor $M_1$ and the ground in response to a first switching signal transmitted based on result of comparison by first comparator 38. For example, first switch 35 may be MOS transistor such as eleventh transistor $M_{11}$. Eleventh transistor $M_{11}$ is an N-type having a gate connected to the first switching signal generated from an output terminal of first comparator 38 and a source/drain connected to both the gate of first transistor $M_1$ and the ground.

First synthesizer 34 synthesizes reference voltage $V_{REF}$ and the low point of offset voltage $V_{OL}$ and outputs the result of the synthesizing to a positive input terminal (+) of first comparator 38. First comparator 38 compares the output of first synthesizer 34 with feedback voltage $V_{FB}$ transmitted via a negative input terminal (−) and outputs the first switching signal to first switch 35 based on the result of the comparison.

Decrease limiter 132A may further include first switch 37. Third switch 37 may switch-on between first switch 35 and the ground when error amplifier 120A operates. For that, third switch 37 may be a MOS transistor such as thirteenth transistor $M_{13}$ that is an N-type. Thirteenth transistor $M_{13}$ has a gate connected to the gates of the sixth transistor $M_6$ and tenth transistor $M_{10}$ and a source/drain connected to both the drain of eleventh transistor $M_{11}$ and the ground. In this case, a gate voltage of sixth transistor $M_6$ is used as signal for controlling the switching of third switch 37.

When the load current decreases, increase limiter 134 or increase limiter 134A limits output voltage $V_{OUT}$ from increasing beyond a high point of offset voltage $V_{OH}$ and for that increase limiter 134A includes second switch 33, second synthesizer 32 and second comparator 36. Second switch 33 switches between input voltage $V_{IN}$ and the gate of first transistor $M_1$. For example, second switch 33 may be a MOS transistor such as twelfth transistor $M_{12}$ that is a P-type. Twelfth transistor $M_{12}$ has a source connected to input voltage $V_{IN}$, a gate connected to a second switching signal output from second comparator 36 and a drain connected to the gate of first transistor $M_1$. Second synthesizer 32 synthesizes reference voltage $V_{REF}$ and the high point of offset voltage $V_{OH}$ and outputs the result of the synthesizing to a positive input terminal (+) of second comparator 36.

Second comparator 36 compares the output of the second synthesizer transmitted from the positive input terminal with feedback voltage $V_{FB}$ transmitted from the negative input terminal (−) and outputs the second switching signal to second switch 33 based on the result of the comparison. In accordance with embodiments, increase limiter 134A may further include fourth switch 31. Fourth switch 31 may switch on between input voltage $V_{IN}$ and second switch 33. For example, fourth switch 31 may be a MOS transistor, such as fourteenth transistor $M_{14}$ that is a P-type. Fourteenth transistor $M_{14}$ has a gate connected to gates of third transistor $M_3$ and fourth transistor $M_4$, a source connected to input voltage $V_{IN}$ and a drain connected to the source of twelfth transistor $M_{12}$. In this case, the gate of fourth transistor $M_4$ may be used as a signal for controlling the switching of fourteenth transistor $M_{14}$.

In accordance with embodiments, the LDO voltage regulator may be embodied as an integrated circuit (IC).

As follows, a method of operating an LDO voltage regulator in accordance with embodiments will be described in the accompanying example drawings. If reference voltage generator 100 and error amplifier 120 illustrated in example FIG. 1 are operating differently, the method of operating the LDO voltage regulator in accordance with embodiments may be applicable. For sake of convenience, the method of operating the LDO voltage regulator will be described on the premise that error amplifier 120 and level limiter 130 are embodied as illustrated in example FIG. 2.

Example FIG. 3 is a flow chart illustrating the method of operating the LDO voltage regulator while example FIG. 4 is a graph illustrating the method of operating the LDO voltage regulator, with a vertical axis referenced to as "Time" and a horizontal axis having a left side referenced to as "Output Voltage ($V_{OUT}$)" and a right side referenced to as "Load Current ($I_{oad}$)".

Error amplifier 120, 120A will be described in detail as follows. Third transistor $M_3$ and fourth transistor $M_4$ form a current mirror and fifth transistor $M_5$ and sixth transistor $M_6$ are biased by reference voltage $V_{REF}$, employed to operate current sources third transistor $M_3$ and fourth transistor $M_4$. Error amplifier 120 compares feedback voltage $V_{FB}$ with reference voltage $V_{REF}$. If feedback voltage $V_{FB}$ is higher than the reference voltage, error amplifier 120 generates an error signal having a "high" level and then the P-type first MOS transistor $M_1$ is turned off. If feedback voltage $V_{FB}$ is smaller thane reference voltage $V_{REF}$, error amplifier 120 generates an error signal having a "low" level and then P-type first MOS transistor $M_1$ is turned on.

Because of the above operation, unregulated input voltage $V_{IN}$ is changed into regulated output voltage $V_{OUT}$. In this state, first synthesizer 34 synthesizes reference voltage $V_{REF}$ and the low point of offset voltage $V_{OL}$ and second synthesizer 32 synthesizes reference voltage $V_{REF}$ and the high point of offset voltage $V_{OH}$ (S50). The high point and the low point of offset voltage $V_{OH}$ are predetermined values preset when the regulator illustrated in example FIG. 1 is designed.

The operation of level limiter 130, 130A will described as follows. After step S50, it is recognized based on the result of the comparison between the synthesizing performed by the first synthesizer 34 and second synthesizer 32 whether the level of the load current changes to increase or decrease. Then, the level of the output voltage is limited from increasing beyond offset voltage $V_{OH}$ or from decreasing below offset voltage $V_{OH}$ based on the result of the recognition. (S52 to S56). Steps S52 to S56 will be described in detail as follows. First, first comparator 38 and second comparator 36 determine whether the load current increases or decrease (S52). To accomplish this, first comparator 38 and second comparator 36 compare feedback voltage $V_{FB}$ with the result of the synthesizing.

As illustrated in example FIG. 4, if the low level load current rapidly increases to a maximum level load current, output voltage $V_{OUT}$ is limited from decreasing below the low point of offset voltage $V_{OL}$ (S54). Example FIG. 4 illustrates characteristics of LDO voltage regulator 60 in accordance with embodiments and LDO voltage regulator 70. In contrast to LDO voltage regulator 70, LDO voltage regulator 60 in accordance with embodiments exhibits an output voltage that increases again when it reaches almost the low point of offset voltage $V_{OL}$.

If feedback voltage $V_{FB}$ is higher than the voltage synthesized by first synthesizer 34, first comparator 38 generates a "high" level signal and turns on eleventh MOS transistor $M_{11}$. As a result, a path having a current flowing there through is formed toward the ground from the gate of first MOS transistor $M_1$ via eleventh MOS transistor $M_{11}$ and thirteenth MOS transistor $M_{13}$. Here, thirteenth MOS transistor $M_{13}$ is saturated while error amplifier 120A is biased. As the voltage applied to the gate of first MOS transistor $M_1$ decreases, output voltage $V_{OUT}$ decreases until the low point of offset voltage $V_{OL}$, not below the low point, increases again.

During step S54, second comparator 36 generates a "high" level signal and twelfth MOS transistor $M_{12}$ is turned off, such that the path having the current there through toward the gate of first MOS transistor $M_1$ from fourteenth MOS transistor $M_{14}$ may not be formed. As a result, while decrease limiter 132A is operating, second switch 33 and fourth switch 31 do not have to consume currents unnecessarily. However, if the load current is decreasing rapidly opposite to example FIG. 4, the output voltage is limited from decreasing beyond the high point of offset voltage $V_{OH}$ (S56).

If feedback voltage $V_{FB}$ is higher than the voltage synthesized by second synthesizer 32, second comparator 36 generates a "low" level signal and turns on twelfth MOS transistor $M_{12}$. As a result, the path is formed to flow the current toward the gate of first MOS transistor $M_1$ from input voltage $V_{IN}$ via the fourteenth MOS transistor $M_{14}$ and twelfth MOS transistor $M_{12}$. Here, fourteenth MOS transistor $M_{14}$ is always saturated while error amplifier 120A is biased. As a result, the voltage applied to the gate of first MOS transistor $M_1$ increases and output voltage $V_{OUT}$ increases unto the high point of offset voltage $V_{OH}$, not beyond the high point, and decreases. During step S56, first comparator 38 generates a "low" level signal and turns off eleventh MOS transistor $M_{11}$. As a result, the current may not flow toward the ground from the gate of first MOS transistor $M_1$ only to reduce unnecessary current consumed by the first switch 35 and third switch 37.

Meanwhile, first MOS transistor $M_1$ is a power transistor and an aspect ratio (W/L) of thirteenth MOS transistor $M_{13}$ is in multiple-proportion to an aspect ratio of sixth MOS transistor $M_6$. Similarly, an aspect ratio (W/L) of fourteenth MOS transistor $M_{14}$ is in multiple-proportion to an aspect ratio of fourth MOS transistor $M_4$. For example, if the current flowing toward the ground from input voltage $V_{IN}$ via fourth MOS transistor $M_4$ and sixth MOS transistor $M_6$ is 1 µA, each size of thirteenth MOS transistor $M_{13}$ and fourteenth MOS transistor $M_{14}$ may be ten times as each size of sixth MOS transistor $M_6$ and fourth MOS transistor $M_4$. If thirteenth MOS transistor $M_{13}$ and fourteenth MOS transistor $M_{14}$ are directly connected without first comparator 38 and second comparator 36, the current flowing thirteenth MOS transistor $M_{13}$ and fourteenth MOS transistor $M_{14}$ is 10 µA and a standby current is getting large. However, as mentioned above, the current path is formed alternatively and thus the current consumed by switches 31, 33 or switches 35, 37 unnecessarily may be reduced.

Therefore, in the voltage regulator in accordance with embodiments, first comparator 38 and second comparator 36 are operating alternatively in a transient response such that the voltage applied to the gate of first MOS transistor $M_1$ may be changed rapidly. Because of that, the speed of the transient response is improved and the slew ratio of the output voltage may be improved accordingly.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A low-dropout (LDO) voltage regulator comprising:
    an error amplifier which compares a reference voltage with a feedback voltage of an output voltage and outputs an error signal based on the result of the comparison, the error amplifier being biased by an input voltage;
    a first MOS transistor having a gate electrically connected to the error signal, a source electrically connected to the input voltage and a drain electrically connected to the output voltage;
    a voltage divider which transmits a predetermined part of the output voltage to the error amplifier as feedback voltage; and
    a level limiter which limits a level of the output voltage from changing beyond and below an offset voltage when a level of a load current changes, wherein the level limiter comprises:
  a decrease limiter which limits the output voltage from decreasing below a low point of the offset voltage when the load current increases; and
  an increase limiter which limits the output voltage from increasing beyond a high point of the offset voltage when the load current decreases.

2. The LDO voltage regulator of claim 1, wherein the error amplifier comprises:
  a second MOS transistor comprising a source electrically connected to the input voltage and a gate electrically connected to a positive bias voltage;
  a third MOS transistor comprising a source electrically connected to the input voltage and a gate and a drain electrically connected to each other;
  a fourth MOS transistor comprising a source electrically connected to the input voltage, a gate electrically connected to the gate of the third MOS transistor and a drain electrically connected to the gate of the first MOS transistor;
  a fifth MOS transistor comprising a source electrically connected to the gate/drain of the third MOS transistor and a drain electrically connected to the ground;
  a sixth MOS transistor comprising a source electrically connected to both the gate of the fourth MOS transistor and the gate of the first MOS transistor and a drain electrically connected to the ground;
  a seventh MOS transistor comprising a source electrically connected to the drain of the second MOS transistor and a gate electrically connected to the reference voltage;
  an eighth MOS transistor comprising a source electrically connected to the drain of the second MOS transistor and a gate electrically connected to the feedback voltage;
  a ninth MOS transistor comprising a source and a gate electrically connected to both the drain of the seventh MOS transistor and the gate of the fifth MOS transistor and a drain electrically connected to the ground; and
  a tenth MOS transistor comprising a source and a gate electrically connected to both the drain of the eighth MOS transistor and the gate of the sixth MOS transistor and a drain electrically connected to the ground.

3. The LDO voltage regulator of claim 1, wherein the increase limiter comprises:
  a second switch which switches between the input voltage and the gate of the first MOS transistor in response to a second switching signal;
  a second synthesizer which synthesizes the reference voltage and the high point of the offset voltage; and
  a second comparator which compares an output of the second synthesizer with the feedback voltage and outputs the second switching signal based on the result of the comparison.

4. The LDO voltage regulator of claim 1, wherein the decrease limiter comprises:
  a first switch which switches between the gate of the first MOS transistor and a ground in response to a first switching signal;
  a first synthesizer which synthesizes the reference voltage and the low point of the offset voltage; and
  a first comparator which compares an output of the first synthesizer and the feedback voltage and outputs the first switching signal based on the result of the comparison.

5. The LDO voltage regulator of claim 4, wherein the decrease limiter further comprises:
  a third switch which switches between the first switch and the ground when the error amplifier operates.

6. The LDO voltage regulator of claim 5, wherein the increase limiter further comprises:
  a fourth switch which switches between the input voltage and the second switch when the error amplifier operates.

7. The LDO voltage regulator of claim 6, wherein the error amplifier comprises:
  a second MOS transistor comprising a source electrically connected to the input voltage and a gate electrically connected to a positive bias voltage;
  a third MOS transistor comprising a source electrically connected to the input voltage and a gate and a drain electrically connected to each other;
  a fourth MOS transistor comprising a source electrically connected to the input voltage, a gate electrically connected to the gate of the third MOS transistor and a drain electrically connected to the gate of the first MOS transistor;
  a fifth MOS transistor comprising a source electrically connected to the gate/drain of the third MOS transistor and a drain electrically connected to the ground;
  a sixth MOS transistor comprising a source electrically connected to both the gate of the fourth MOS transistor and the gate of the first MOS transistor and a drain electrically connected to the ground;
  a seventh MOS transistor comprising a source electrically connected to the drain of the second MOS transistor and a gate electrically connected to the reference voltage;
  an eighth MOS transistor comprising a source electrically connected to the drain of the second MOS transistor and a gate electrically connected to the feedback voltage;
  a ninth MOS transistor comprising a source and a gate electrically connected to both the drain of the seventh MOS transistor and the gate of the fifth MOS transistor and a drain electrically connected to the ground; and
  a tenth MOS transistor comprising a source and a gate electrically connected to both the drain of the eighth MOS transistor and the gate of the sixth MOS transistor and a drain electrically connected to the ground.

8. The LDO voltage regulator of claim 7, wherein the gate of the sixth transistor comprises a signal which controls the switching of the first switch.

9. The LDO voltage regulator of claim 7, wherein the gate of the fourth transistor comprises a signal which controls the switching of the fourth switch.

10. The LDO voltage regulator of claim 7, wherein the first switch comprises an eleventh MOS transistor having a gate electrically connected to the first switching signal and a source/drain electrically connected to both the gate of the first MOS transistor and the ground.

11. The LDO voltage regulator of claim 10, wherein the third switch comprises a thirteenth MOS transistor having a gate electrically connected to the gate of the sixth MOS transistor and the gate of the tenth MOS transistor and a source/drain electrically connected to both the drain of the eleventh MOS transistor and the ground.

12. The LDO voltage regulator of claim 7, wherein the second switch comprises a twelfth MOS transistor having a source electrically connected to the input voltage, a gate electrically connected to the second switching signal and a drain electrically connected to the gate of the first MOS transistor.

13. The LDO voltage regulator of claim 12, wherein the fourth switch comprises a fourteenth MOS transistor having a gate electrically connected to the gate of the third MOS transistor and the gate of the fourth MOS transistor, a source electrically connected to the input voltage and a drain electrically connected to the source of the twelfth MOS transistor.

14. The LDO voltage regulator of claim 1, wherein the voltage divider comprises a first resistance and a second resistance electrically connected in series between the output voltage and the ground.

15. The LDO voltage regulator of claim 14, wherein the feedback voltage is electrically connected between the first resistance and the second resistance.

16. A low-dropout (LDO) voltage regulator comprising:
an error amplifier comprising a plurality of transistors which compares a reference voltage with a feedback voltage of an output voltage and outputs an error signal based on the result of the comparison, the error amplifier being biased by an input voltage;
a first MOS transistor having a gate electrically connected to the error signal, a source electrically connected to the input voltage and a drain electrically connected to the output voltage;
a voltage divider which transmits a predetermined part of the output voltage to the error amplifier as feedback voltage, the voltage divider including a first resistance and a second resistance electrically connected in series between the output voltage and the ground; and
a level limiter which limits a level of the output voltage from changing beyond and below an offset voltage when a level of a load current changes,
wherein the level limiter comprises:
a decrease limiter which limits the output voltage from decreasing below a low point of the offset voltage when the load current increases; and
an increase limiter which limits the output voltage from increasing beyond a high point of the offset voltage when the load current decreases.

17. The LDO voltage regulator of claim 16, wherein the plurality of transistors comprises:
a second transistor comprising a source electrically connected to the input voltage and a gate electrically connected to a positive bias voltage;
a third transistor comprising a source electrically connected to the input voltage and a gate and a drain electrically connected to each other;
a fourth transistor comprising a source electrically connected to the input voltage, a gate electrically connected to the gate of the third transistor and a drain electrically connected to the gate of the first transistor;
a fifth transistor comprising a source electrically connected to the gate/drain of the third MOS transistor and a drain electrically connected to the ground;
a sixth transistor comprising a source electrically connected to both the gate of the fourth transistor and the gate of the first transistor and a drain electrically connected to the ground;
a seventh transistor comprising a source electrically connected to the drain of the second transistor and a gate electrically connected to the reference voltage;
an eighth transistor comprising a source electrically connected to the drain of the second transistor and a gate electrically connected to the feedback voltage;
a ninth transistor comprising a source and a gate electrically connected to both the drain of the seventh transistor and the gate of the fifth transistor and a drain electrically connected to the ground; and
a tenth transistor comprising a source and a gate electrically connected to both the drain of the eighth transistor and the gate of the sixth transistor and a drain electrically connected to the ground.

18. A method of operating a LDO voltage regulator comprising:
synthesizing a reference voltage and an offset voltage; and then
limiting a level of an output voltage from changing beyond and below the offset voltage when a level of a load current changes by comparing a feed-backed part of an output voltage and the result of the synthesizing,
wherein limiting the level of the output voltage comprises:
limiting the output voltage from decreasing below a low point of the offset voltage when the load current increases; and
limiting the output voltage from increasing beyond a high point of the offset voltage when the load current decreases.

* * * * *